Nov. 21, 1939.   F. O. BERQUIST   2,181,007
PLOWSHARE GUARD
Filed May 19, 1938
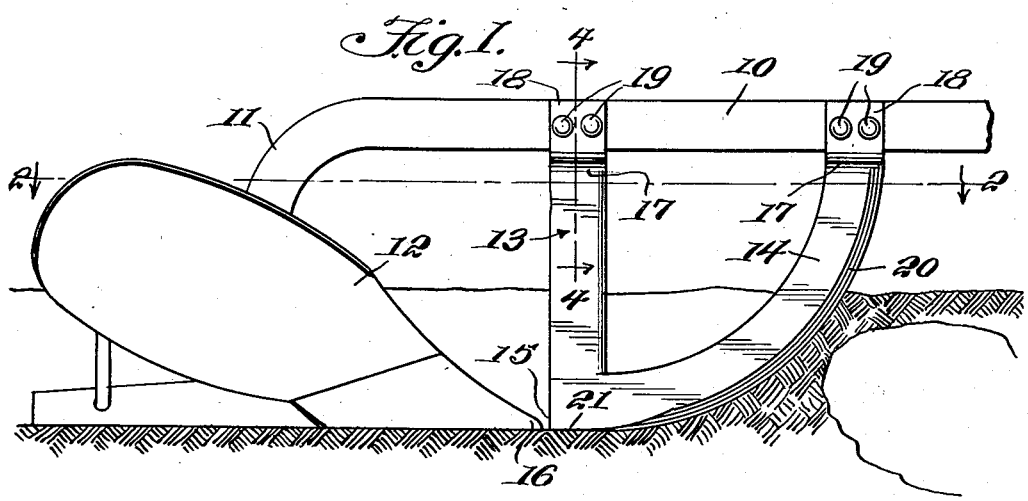
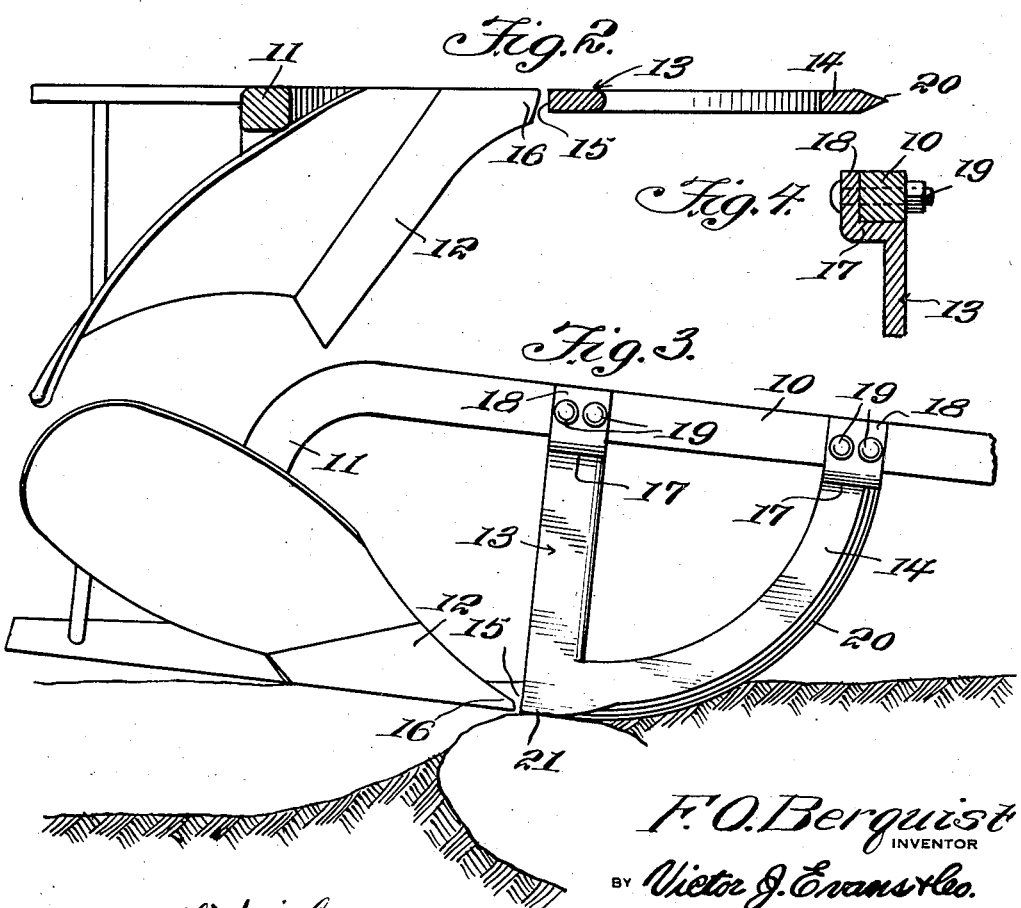
F. O. Berquist
INVENTOR
BY Victor J. Evans & Co.
ATTORNEYS
WITNESS G. T. L. Wright Patented Nov. 21, 1939

2,181,007

UNITED STATES PATENT OFFICE 2,181,007

PLOWSHARE GUARD

Frank O. Berquist, Somerville, Mass.

Application May 19, 1938, Serial No. 208,923

3 Claims. (Cl. 97—208)

This invention relates to plowshare guards and more particularly to a device which may be readily attached to an ordinary plow.

The invention has for its principal object to provide a simple yet strong and durable device which may be applied to an ordinary plow so as to function as a root and vine cutting colter in opening a path ahead of the plowshare and at the same time providing means for riding the plowshare over an obstruction.

The invention consists in the novel form and arrangement of the device and in its particular application to the plow as hereinafter described and defined in the appended claims, reference being had to the accompanying drawing forming a part of this specification, and in which Figure 1 is a side elevation of the plowshare and the adjacent portion of the beam with the guard applied thereto and showing the guard device about to come in contact with an obstacle;

Figure 2 is a section through the plow on or about the line 2—2 of Figure 1;

Figure 3 is a view similar to Figure 1, but showing the guard device as riding over an obstacle; and Figure 4 is a fragmentary section on the line 4—4 of Figure 1.

Referring now to the drawing, the numeral 10 designates the beam of the plow, the rear end portion of which is turned downwardly, as at 11, and has an ordinary share 12 attached thereto in the usual manner.

Mounted on the beam 10, forwardly of the share 12, is a guard which is designated generally by the numeral 13. As shown, the guard comprises an open frame in the general form of a quadrant having an arcuate forward cutting portion 14 terminating in a heel 15 which is located in the same horizontal plane with and closely contiguous to the point 16 of the plowshare. In order to rigidly attach the guard to the plow beam 10 the upper end portions of the arcuate forward member 14 and vertical rear member 13 are offset, as at 17, to form a right angular seat for the beam 10, the extreme upper end portions 18 of said arms 13 and 14 being bolted to the beam 10, as at 19.

The forward edge portion 20 of the arcuate arm 14 of the guard is beveled to a sharp cutting edge throughout substantially the entire length thereof except for a relatively short distance in the immediate region of the heel portion 15, as at 21, by which provision the guard readily enters the soil and functions effectively as a colter for severing roots and vines and cutting a way through the soil in advance of the point 16 of the plowshare, the relatively blunt portion 21 of the device near the heel 15 serving to appreciably retard the digging action of the device and to minimize the wear thereon.

While the device functions as a root and vine cutter it has a special function as a guard to prevent the plowshare point from catching against large vines and roots and other obstructions such as large boulders and ledge rocks which are not readily moved aside, in that the arcuate edge portion 20 rides over such obstructions and lifts the plowshare clear thereof, and by the relative close relation of the plow point 16 to the heel 15 of the guard the point is made to clear the obstruction without catching thereagainst. This is particularly advantageous in the use of tractor drawn plows where it is desirable or necessary to keep the motive power going without interruption or damage to the plow or the power means.

Obviously, the structure may be modified in many respects without departing from the spirit of the invention as defined by the appended claims. The invention, therefore, is not limited to the specific construction and arrangements shown in the drawing.

What is claimed is:

1. A plowshare guard comprising a member attached to the draft beam of the plow in front of the share, said member having an arcuate forward edge portion extending entirely downwardly and rearwardly from the under side of the beam and terminating with a heel point substantially coincident with the point of the plowshare.

2. In a plowshare guard, in combination with the draft beam and share of the plow, a guard comprising a quadrant frame including a straight vertical rear leg member and an arcuate leading leg member joined integrally at their lower ends, the upper ends of said leg members being separately attached to the beam, the arcuate leg member being sharpened to provide a cutting edge extending from top to bottom thereof, the bottom corner of the quadrant constituting the heel of the device and being located substantially coincident with the point of the plowshare.

3. In a plowshare guard, in combination with the beam and share of the plow, a guard comprising a quadrant frame having offset shouldered upper seating portions attached to the beam, the arcuate portion of the frame being disposed forwardly and sharpened to a cutting edge substantially the entire length thereof, the bottom corner portion of the quadrant being relatively blunt on its under side and constituting the heel of the device and the trailing end of said heel being located substantially coincident with the point of the plowshare.

FRANK O. BERQUIST.